(12) United States Patent
Essiambre et al.

(10) Patent No.: US 7,027,740 B2
(45) Date of Patent: Apr. 11, 2006

(54) METHOD AND APPARATUS FOR EXTENDING OPTICAL COMMUNICATION

(75) Inventors: Rene'-Jean Essiambre, Red Bank, NJ (US); Lisa Kathleen Wickham, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 737 days.

(21) Appl. No.: 10/152,645

(22) Filed: May 21, 2002

(65) Prior Publication Data

US 2004/0208617 A1 Oct. 21, 2004

(51) Int. Cl.
H04B 10/12 (2006.01)
H04B 10/00 (2006.01)
H04J 14/02 (2006.01)

(52) U.S. Cl. ......................... 398/147; 398/148; 398/81; 398/158

(58) Field of Classification Search ................ 398/192, 398/193, 208, 147, 148, 81, 158, 43, 79, 398/140, 141; 359/337.5
See application file for complete search history.

(56) References Cited

U.S. PATENT DOCUMENTS

| | | | |
|---|---|---|---|
| 6,594,428 B1* | 7/2003 | Tanaka et al. | 385/123 |
| 6,659,614 B1* | 12/2003 | Katayama et al. | 359/846 |
| 2002/0093706 A1* | 7/2002 | Lu et al. | 359/124 |
| 2002/0105719 A1* | 8/2002 | Tanaka et al. | 359/337.5 |
| 2002/0131160 A1* | 9/2002 | McNicol | 359/337.5 |
| 2003/0039006 A1* | 2/2003 | Carbone et al. | 359/124 |
| 2004/0208525 A1* | 10/2004 | Seydnejad et al. | 398/33 |
| 2004/0208605 A1* | 10/2004 | Bakhshi et al. | 398/147 |
| 2004/0208607 A1* | 10/2004 | Eiselt et al. | 398/147 |

OTHER PUBLICATIONS

M. I. Hayee and A. E. Willner, "Pre- and post-compensation of dispersion and nonlinearities in 10-Gb/s WDM systems", 1997, IEEE Photonics Technology Letters, vol. 9, pp. 1271-1273.*

* cited by examiner

Primary Examiner—M. R. Sedighian
Assistant Examiner—Quan-Zhen Wang

(57) ABSTRACT

A method and apparatus is proposed for use in a communication system in which an optical communications path including a plurality of optical spans, each of the optical spans contributing nonlinear distortions to an optical signal passing there-through includes, providing a dispersion pre-compensation to the optical signal in the optical communications path, such that the limiting nonlinear effect that produces signal distortions for long-haul transmission is suppressed, prior to transmission through a plurality of optical spans, and providing a dispersion post-compensation to the optical signal in the optical communications path after transmission through the plurality of optical spans.

20 Claims, 9 Drawing Sheets

100

DISPERSION MAPPING

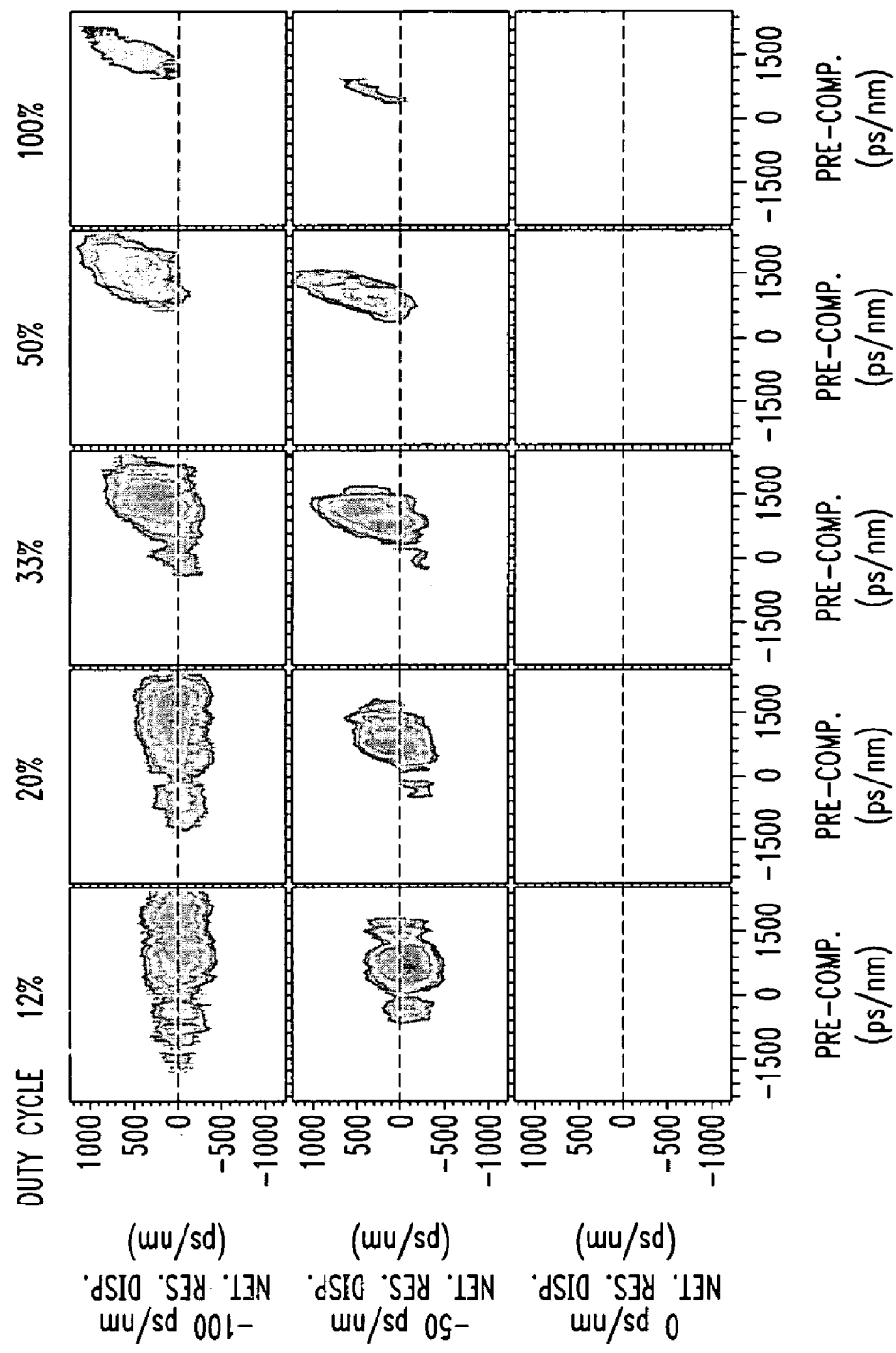

METHOD AND APPARATUS FOR EXTENDING OPTICAL COMMUNICATION

FIELD OF THE INVENTION

This invention relates to the field of optical data transmission systems and, more specifically, to long-haul optical communication.

BACKGROUND OF THE INVENTION

In optical communication systems, non-linear optical effects are known to degrade the quality of transmission along optical fiber and reduce the transmission distance. These non-linear effects, which include four-wave mixing (FWM), self-phase modulation (SPM), cross-phase modulation (XPM), modulation instability (MI), stimulated Brillouin scattering (SBS) and stimulated Raman scattering (SRS), particularly cause distortion in high power systems. Group velocity dispersion also provides a limitation to quality transmission of optical signals across long distances. Group velocity dispersion broadens an optical pulse during its transmission across long distances. Dispersion of an optical pulse, though, can be reduced by decreasing the spacing between regenerators in a communications system, but this approach is costly. Another known solution for counteracting dispersion is the method of adding suitable dispersion compensating devices, such as gratings or dispersion compensating fibers, to the telecommunication system. This solution is effective but adds cost.

One solution to overcome the effects of dispersion in optical communications system without adding substantial cost has been through the use of soliton pulses; particular types of RZ (Return-to-Zero) modulation signals that maintain their pulse width over longer distances by balancing the effects of group velocity dispersion with the non-linear phenomenon of self-phase modulation. A possible problem that arises in the transmission of solitons though, is that a conventional optical transmission fiber is lossy, which causes the peak power of the soliton pulse to decrease exponentially along the length of the fiber between optical amplifiers, therefore disrupting the balance between nonlinearity and dispersion responsible for soliton existence. A solution to this problem is to use dispersion-compensated (DC) solitons, such that pulses are allowed to broaden but only within the limit of the distance between pulses. This regime is achieved by the use of dispersion compensating devices placed in the optical communications path according to specific rules. Any regime that will permit pulse broadening beyond the pulse period is believed to result in inferior performance relative to the above-mentioned technique.

SUMMARY OF THE INVENTION

The invention comprises a method and apparatus that, under specific conditions, exhibit better transmission performance than DC soliton pulses, thus extending optical communication. This method and apparatus result in a new method (regime) of transmission.

In one embodiment of the present invention, a method includes pre-compensating an optical signal to compensate for a cumulative dispersion optimized for a single, typical optical span whose value depends on the average power evolution of the optical signal in an optical communications path, and to compensate for an amount of dispersion introduced into the optical communications path by any subsequent optical spans.

In another embodiment of the present invention, a method is provided for use in a communication system in which an optical communications path comprises a plurality of optical spans, each of the optical spans contributing substantially similar nonlinear distortions to an optical signal passing there-through. The method includes, providing a dispersion pre-compensation to the optical signal in the optical communications path prior to transmission through the plurality of optical spans such that the limiting nonlinear effect that produces signal distortions is suppressed, wherein the amount of the dispersion pre-compensation is determined by calculating an amount of cumulative dispersion introduced into the optical communications path by the plurality of optical spans, dividing the amount of the calculated cumulative dispersion by two, and subtracting the divided amount of calculated cumulative dispersion from a cumulative dispersion optimized for a single, typical optical span, wherein the amount of cumulative dispersion introduced into the optical communications path by the plurality of optical spans is equal to the total number of spans in the communications path, minus one, multiplied by the amount of dispersion introduced by each span, and wherein the cumulative dispersion optimized for a single, typical optical span has a value that depends on the power evolution of the optical signal in the optical communications path, and providing a dispersion post-compensation to the optical signal in the optical communications path after transmission through the plurality of optical spans.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for extending optical communication such that, under specific conditions, exhibits better transmission performance than soliton pulses. This method and apparatus result in a new method (regime) of transmission.

Figure 1:
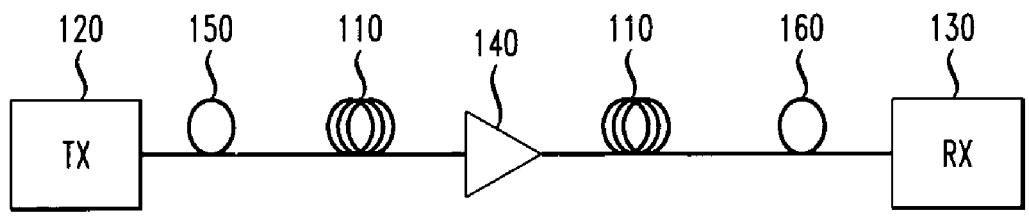
FIG. 1 depicts a block diagram of a communication system 100 in accordance with the present invention.

FIG. 1 depicts a block diagram of a communication system 100 in accordance with the present invention. The communication system 100 includes one or more spans of transmission fiber 110, a transmitting terminal 120, a receiving terminal 130, one or more optical amplifiers (collectively 140), and dispersion-compensating elements 150 and 160. The transmitting terminal 120 provides an optical data signal that is to be transmitted to the remotely located receiving terminal 130 via the one or more spans of transmission fiber 110. The optical signal may comprise a plurality of WDM optical carrier wavelengths on which data is modulated in any appropriate transmission format.

The dispersion-compensating elements 150 and 160 may be any appropriate device that can provide dispersion compensation. Exemplary dispersion-compensating elements include single-mode fibers, dispersion-compensating fibers, and diffraction gratings. Dispersion-compensating elements 150 and 160 may or may not be directly incorporated into the terminals themselves. In some cases the dispersion-compensating elements 150 and 160 may be a part of the transmission fiber 110 or the optical amplifiers 140.

The optical communications path comprises a plurality of successive spans having known residual dispersions per span. Briefly stated, the signal from the transmitting terminal 120 propagates through the first dispersion-compensating element 150 such that the signal receives a dispersion pre-compensation. The signal then propagates through the transmission fiber 110 and typically encounters at least one amplifier 140 until encountering the second dispersion-compensating element 160. The signal propagates through the second dispersion-compensating element 160 such that the signal receives a dispersion post-compensation. The signal is then received by the receiving element 130. The desired effect is to achieve optimal transmission in the communication system 100 by providing a dispersion pre-compensation and a dispersion post-compensation. Although the present invention is being described within the context of a simple communication system, the invention can be implemented within any known communication system.

A communication system is known by either having knowledge of the components of a system and their properties, or by experimental accumulation of data of the properties of the components of a system. In known communication systems (known transmission lengths, spans, etc.) dispersive and nonlinear distortions are simultaneously minimized by dispersion management techniques. One dispersion management technique is known as periodic dispersion mapping. There are typically three degrees of freedom for periodic dispersion mapping:

1) Cumulative Dispersion Pre-Compensation: $C_{PRE}$ [ps/nm];

2) Cumulative Residual Dispersion Per Span: $C_{RDPS}$ [ps/nm]; and

3) Cumulative Net Residual Dispersion: $C_{NRD}$ [ps/nm].

Figure 2:
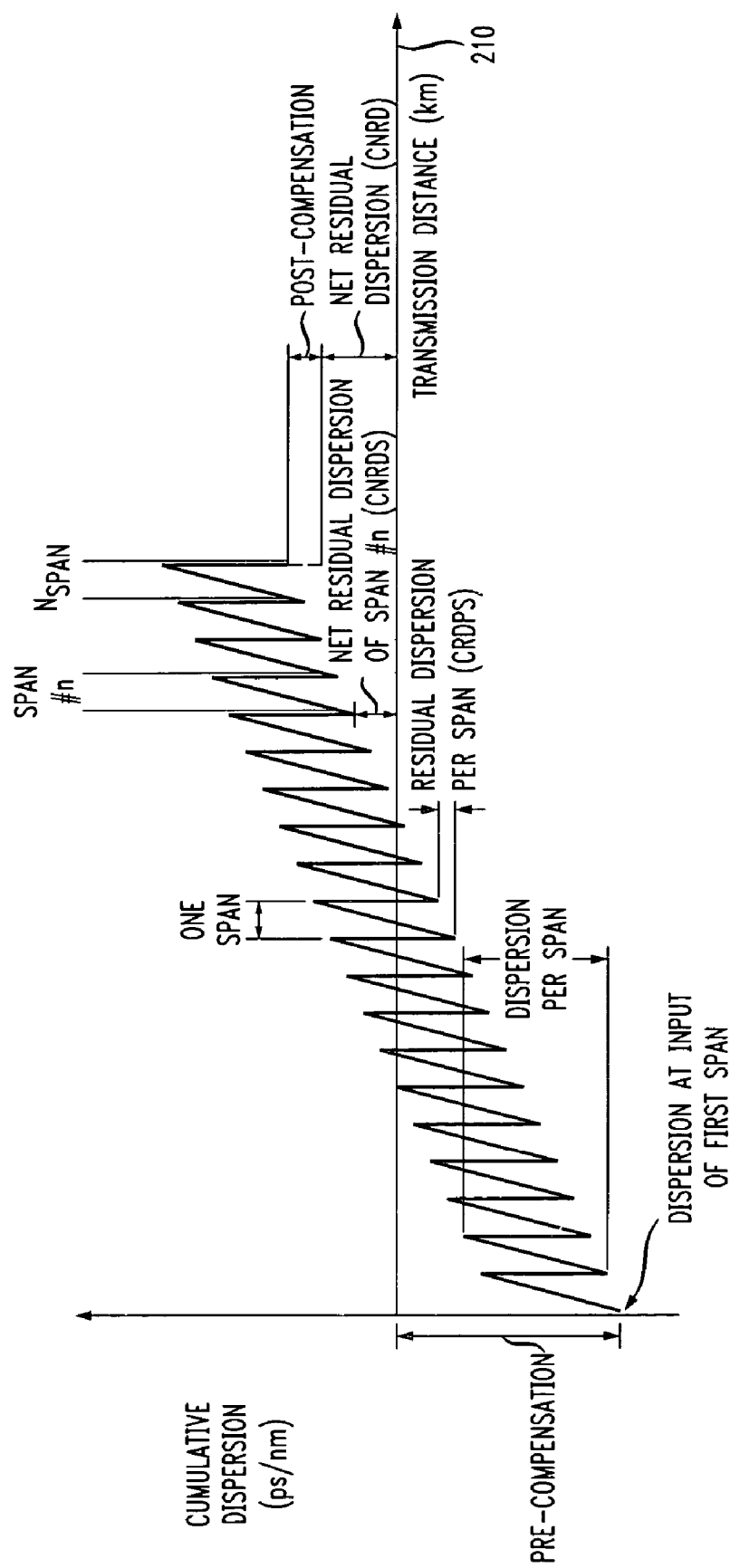
FIG. 2 graphically depicts the relationship between the three degrees of freedom for periodic dispersion mapping.

FIG. 2 graphically depicts the relationship between the three degrees of freedom for periodic dispersion mapping in a communication system. FIG. 2 includes an optical communications path 210 in which an optimum pre-compensation ($C_{PRE}^{opt}$) is chosen such that the path average dispersion for the whole optical communications path 210 is appropriately small and $C_{NRD}$ is optimized for best transmission. Under these conditions, the dispersion map is optimized for a new regime of transmission.

$C_{PRE}$ is depicted on the bottom left side of the graph beginning on the y-axis. $C_{PRE}$ is the cumulative dispersion pre-compensation and defines the dispersion at the input of a first span of the optical communications path 210. As illustrated, $C_{PRE}$ is a calculated dispersion introduced into the optical communications path 210 to establish desired transmission operating conditions, the new regime of transmission.

$C_{RDPS}$, as illustrated in FIG. 2, is defined as the dispersion introduced into the system by each subsequent span. The optimum pre-compensation depends on the cumulative residual dispersion per span. This cumulative residual dispersion per span can be of any value, but preferentially is optimized also. Typical optimized values of residual cumulative dispersion per span range from +20 to +100 or from −100 to −20 ps/nm.

$C_{NRD}$ is depicted in FIG. 2 as the cumulative dispersion at the end of the optical communications path after post-compensation. The $C_{NRD}$ should be optimized for best transmission results to further optimize for the new regime of transmission.

As depicted, the map is made symmetrical such that the limiting nonlinear effect that produces signal distortions for 10 Gb/s long-haul transmission (pulse-to-pulse) interaction is suppressed. Achieving this symmetry produces the new regime of transmission. The symmetry in an optical communications path containing $N_{span}$ identical spans, is achieved according to the following equation:

$$C_{pre}^{opt} = C_{pre}^{span} - (N_{span}-1)*C_{RDPS}/2. \quad (1)$$

$C_{pre}^{span}$ is a cumulative dispersion optimized for a single span whose value depends on the average power evolution of the signal in the transmission fiber and $C_{RDPS}$ is the amount of cumulative dispersion introduced by each subsequent span. For a passive fiber, $C_{pre}^{span}$ is given by the negative of the cumulative dispersion of typically 10 to 25 km of the transmission fiber. For example, if the dispersion of a passive transmission fiber is 6 ps/(km-nm), than $C_{pre}^{span} = -60$ to $-150$ ps/nm. For active fiber (Raman-pumped for instance), $C_{pre}^{span}$ should be reduced or increased by several tens of ps/nm depending on the type of transmission fiber (sign of the dispersion). Values of $C_{RDPS}$ in the range of +20 to +120 ps/nm or −20 to −120 are typical values. Given the value of $C_{pre}^{opt}$, $C_{NRD}$ should then be optimized for best transmission. For most systems and modulation formats $C_{NRD}$ is zero or slightly positive (~500 ps/nm after a 5000 km transmission). The value of $C_{NRD}$ can be optimized by experimentally incrementing or decrementing the value of $C_{NRD}$ by implementation of post-compensation until transmission is optimized.

For the case of a transmission line composed of non-identical spans, the symmetry in the optical communications path is achieved according to the following equation:

$$C_{pre}^{opt} = N_{span} * C_{pre}^{span} - \sum_{n=2}^{N_{span}} C_{NRDS}(n). \quad (2)$$

$C_{pre}^{span}$ continues to be defined as the cumulative dispersion optimized for a single span as defined in the case for the optical communications path with identical spans (above). $C_{NRDS}(n)$ is defined as the net residual dispersion of span (n), wherein (n) is the span number in the optical communications path (see FIG. 2).

In instances wherein the optical communications path comprises only one span, the contributions of the second term on the right hands side of in equation (1) and equation (2), are equal to zero.

Figure 3:
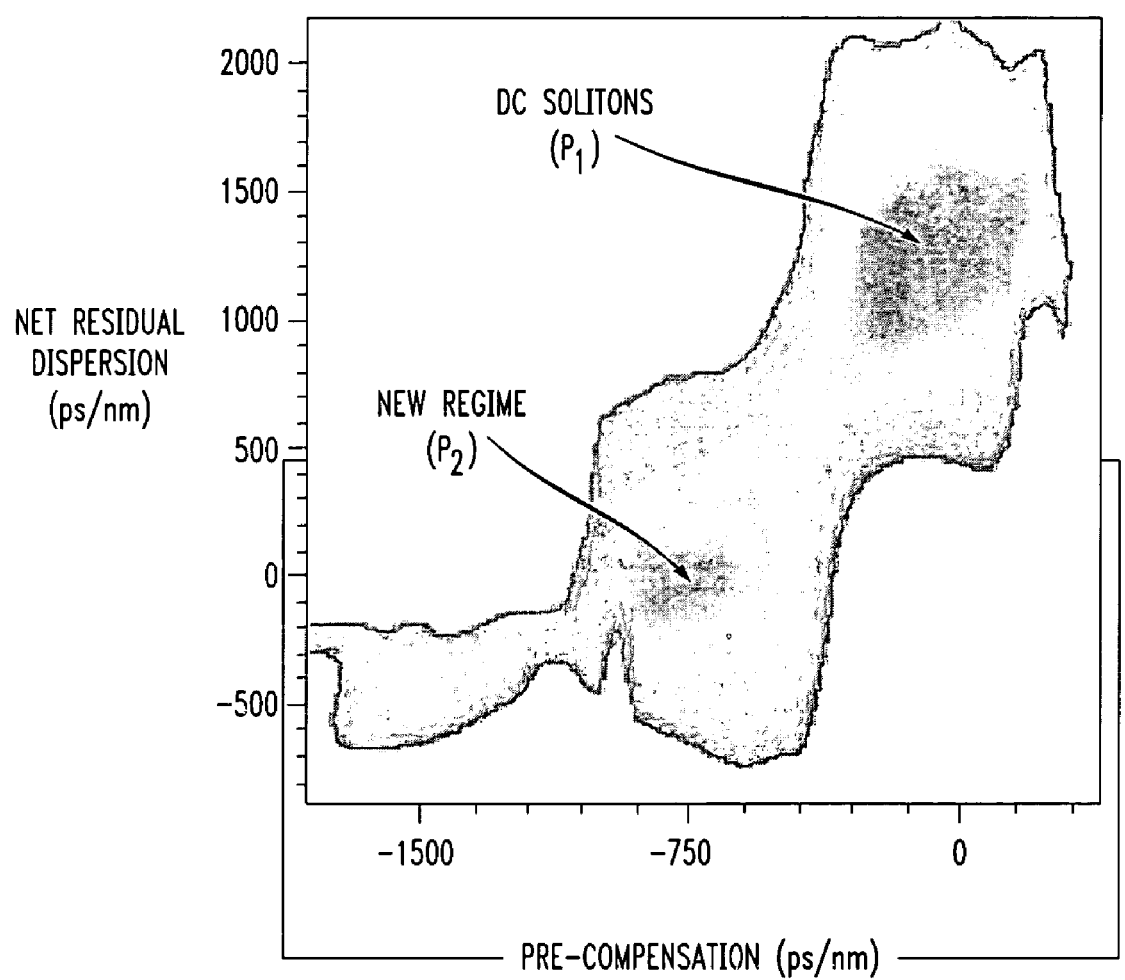
FIG. 3 graphically depicts an eye closure penalty in dB after transmission of a single channel over a 5000-km transmission line.

The superior transmission performance of the invention is proven from numerical simulations of transmissions of signals. FIG. 3 graphically depicts an eye closure penalty in dB after transmission of a single channel over a 5000-km transmission line, graphed as pre-compensation on the x-axis versus net residual dispersion on the y-axis. The bit rate per channel of the system of FIG. 3 is 10 Gb/s with a duty cycle of 33% over a TrueWave™ fiber. The residual dispersion per span is 25 ps/nm. Two areas of good transmission are visible, $P_1$ and $P_2$. $P_1$ is in the vicinity of dispersion-compensated (DC) soliton dispersion mapping. DC solitons have a low positive residual dispersion per span such that the average dispersion ranges from ~0 to ~0.5 ps/(km-nm). The optimum pre-compensation of DC solitons should always be set to compensate for a fraction of the span cumulative dispersion to allow DC soliton dynamics to stabilize the transmission. The optimum pre-compensation for DC solitons of FIG. 2 is −100 ps/nm, 25% of the span cumulative dispersion. Such mapping is consistent with DC soliton mapping and makes the DC soliton dynamics the dominant mechanism for stabilizing the single-channel transmission in the system for this transmission regime. This regime is thus referred to as the DC soliton regime.

FIG. 3 depicts a different regime, $P_2$, of transmission in which a larger optimum pre-compensation $C_{pre}^{opt}$ is preferred. The optimum pre-compensation is approximately twice the span dispersion. For this larger optimum pre-compensation and with the low residual dispersion per span of 25 ps/nm considered in FIG. 3, the pulses never appear as transform-limited within the first 16 spans. This is in contrast to DC soliton transmission, which always requires the pulses to be transform-limited somewhere within each span of the optical communications path.

Figure 4A:
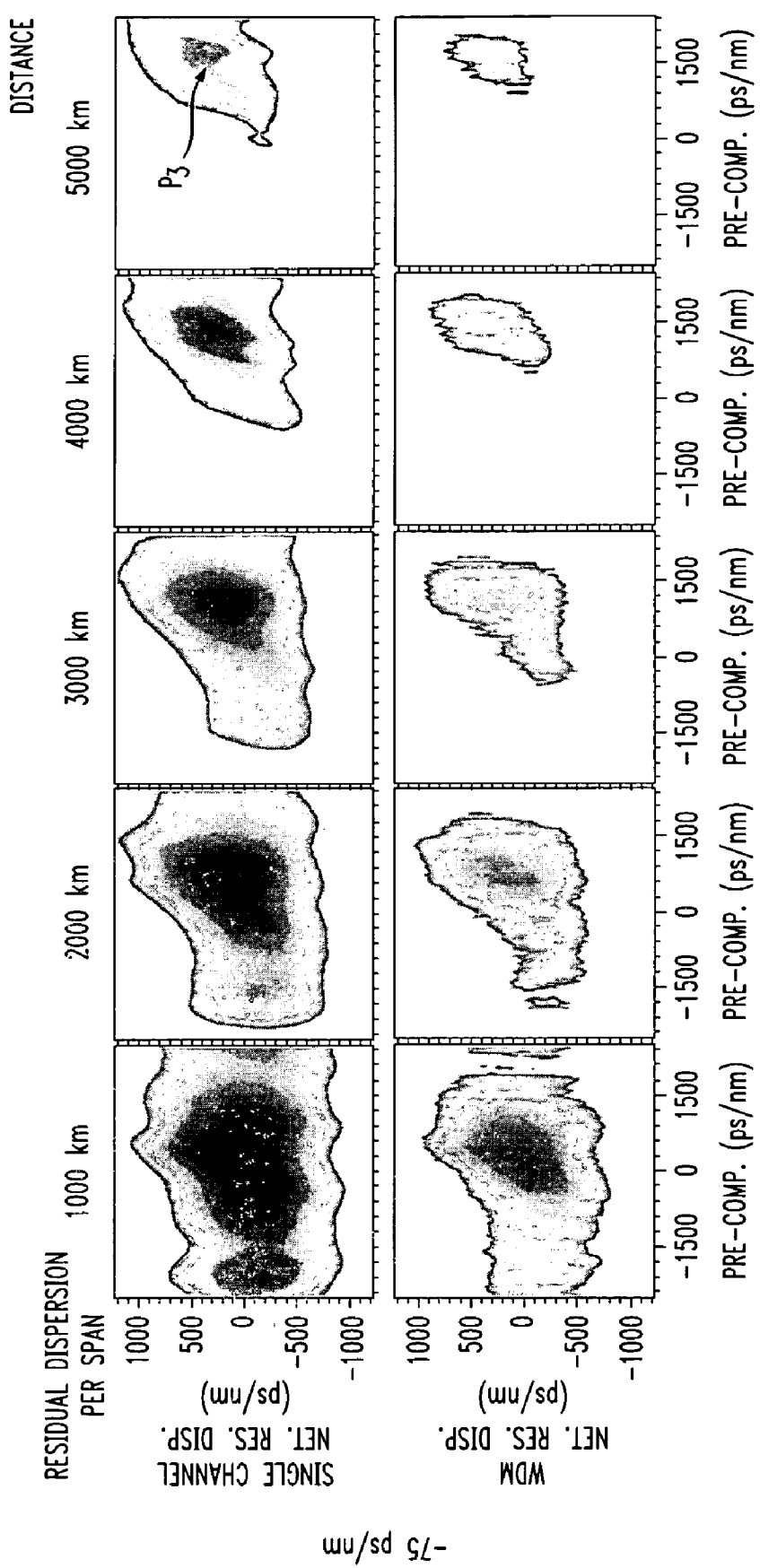
FIG. 4 graphically depicts a comparison between wavelength-division multiplexing (WDM) transmission and single-channel transmission as a function of distance.
Figure 4B:
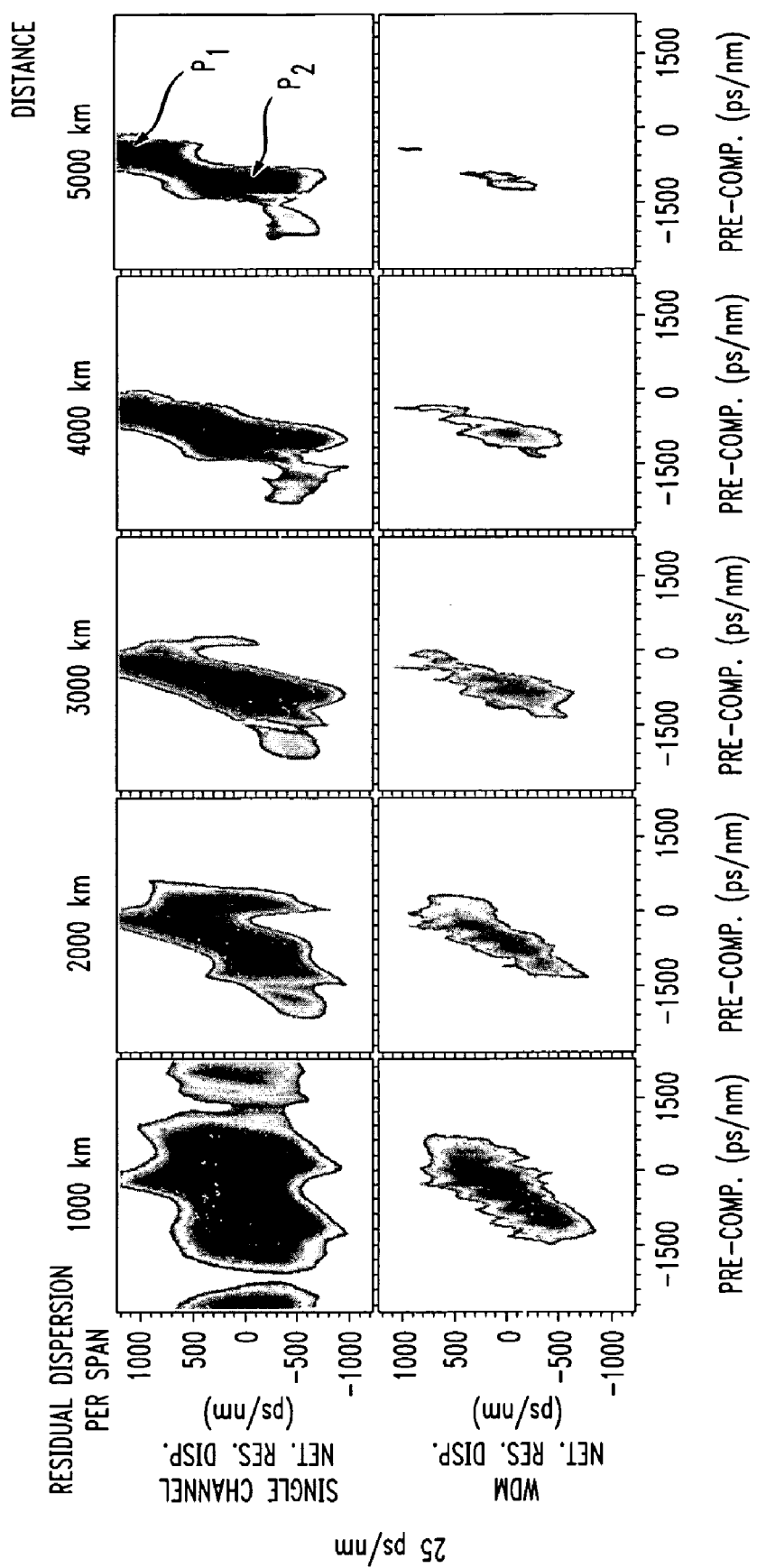

FIG. 4 graphically depicts a comparison between wavelength-division multiplexing (WDM) transmission and single-channel transmission as a function of distance for two different values of residual dispersion per span, graphed as pre-compensation for the x-axis versus post-compensation for the y-axis. The bit rate per channel of the system of FIG. 4 is 10 Gb/s with a duty cycle of 33% over a TrueWave™ fiber with an amplifier spacing of 100 km. The system of FIG. 4 also has 0 dBm per channel, with 8 channels at 50 GHz. Demultiplexing is achieved by filtering each channel with an optical Bessel filter of bandwidth 20 GHz. For a residual dispersion of −75 ps/nm, the optimum dispersion mapping point, $P_3$, is nearly the same for WDM transmission as for single-channel transmission. WDM transmission introduces additional waveform distortions in addition to single-channel distortions. Cross-phase modulation (XPM) is the dominant source of nonlinear WDM interactions. In the case of a positive residual dispersion per span of 25 ps/nm, it is evident that DC solitons, $P_1$, are more affected by WDM effects than the new regime of transmission, $P_2$. This is illustrated in FIG. 4 when comparing single-channel transmission to WDM transmission after 5000 km. It is evident that for small positive residual dispersion where DC solitons are expected to perform well, the best WDM transmission is provided by the new regime of transmission.

Figure 5:
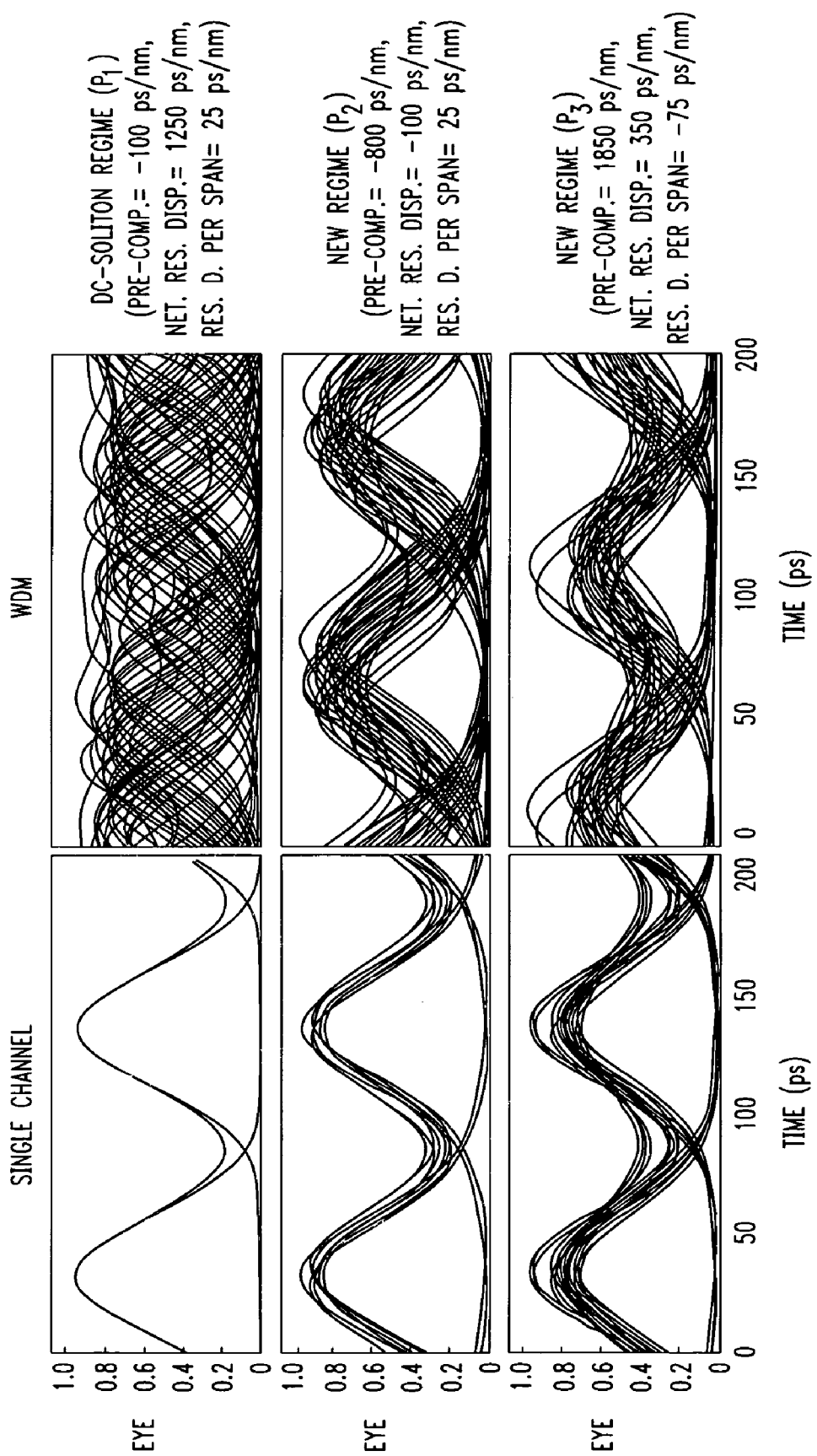
FIG. 5 graphically depicts eye diagrams for single-channel transmission and WDM transmission for the system of FIG. 4.

FIG. 5 graphically depicts eye diagrams for single-channel transmission and WDM transmission for the system of FIG. 4. The top row depicts eye diagrams for the $P_1$ regime of transmission (DC soliton regime), the second row depicts eye diagrams for the $P_2$ regime of transmission (new regime), and the third row depicts eye diagrams for the $P_3$ regime of transmission (new regime at −75 residual dispersion per span). The left column displays the single-channel eye diagrams while the right column displays the WDM eye diagrams. The three operating regimes are described in Table 1.

TABLE 1

| | | Pre-Comp. ps/nm | Res. Dispersion per Span ps/nm | Net Res. Disp. ps/nm |
|---|---|---|---|---|
| $P_1$ | DC Solitons | −100 | 25 | 1250 |
| $P_2$ | New Regime | −800 | 25 | −100 |
| $P_3$ | New Regime | 1850 | −75 | 350 |

FIG. 5 illustrates that even at a small positive residual dispersion per span, which is supposed to be the optimum DC soliton propagation condition, the new regime of transmission performs better than the DC soliton regime. DC solitions are strongly affected by timing jitter generation due to cross-phase modulation. In contrast, the new regime is only slightly affected by cross-phase modulation. The low impact of cross-phase modulation on transmission is the origin of the significant transmission improvement in the new regime of transmission.

The experiment of FIG. 4 was repeated for larger ranges of residual dispersion. The residual dispersion started at −100 ps/nm and increased to +100 ps/nm in steps of 25 ps/nm. The experimental results make it evident that negative residual dispersion per span (in-line over-compensation) results in the best system performance. When a negative residual dispersion per span was used, the signal was capable of longer transmission. This result contradicts the dominant belief in the art that applying low positive residual dispersion per span, producing DC solitons, offers the best performance for long-haul transmission systems based on 10 Gb/s per channel. The test results indicate that the new regime of transmission, at negative residual dispersion per span, results in better transmission performance.

The mapping of the previous experiment was again repeated but this time for a NRZ format signal. Similar results to the previous experiment are achieved with respect to dispersion mapping, but with shorter reach. Again, a negative residual dispersion per span results in better transmission performance, but the NRZ transmission format shortens the reach of the communications system.

Figure 6B:
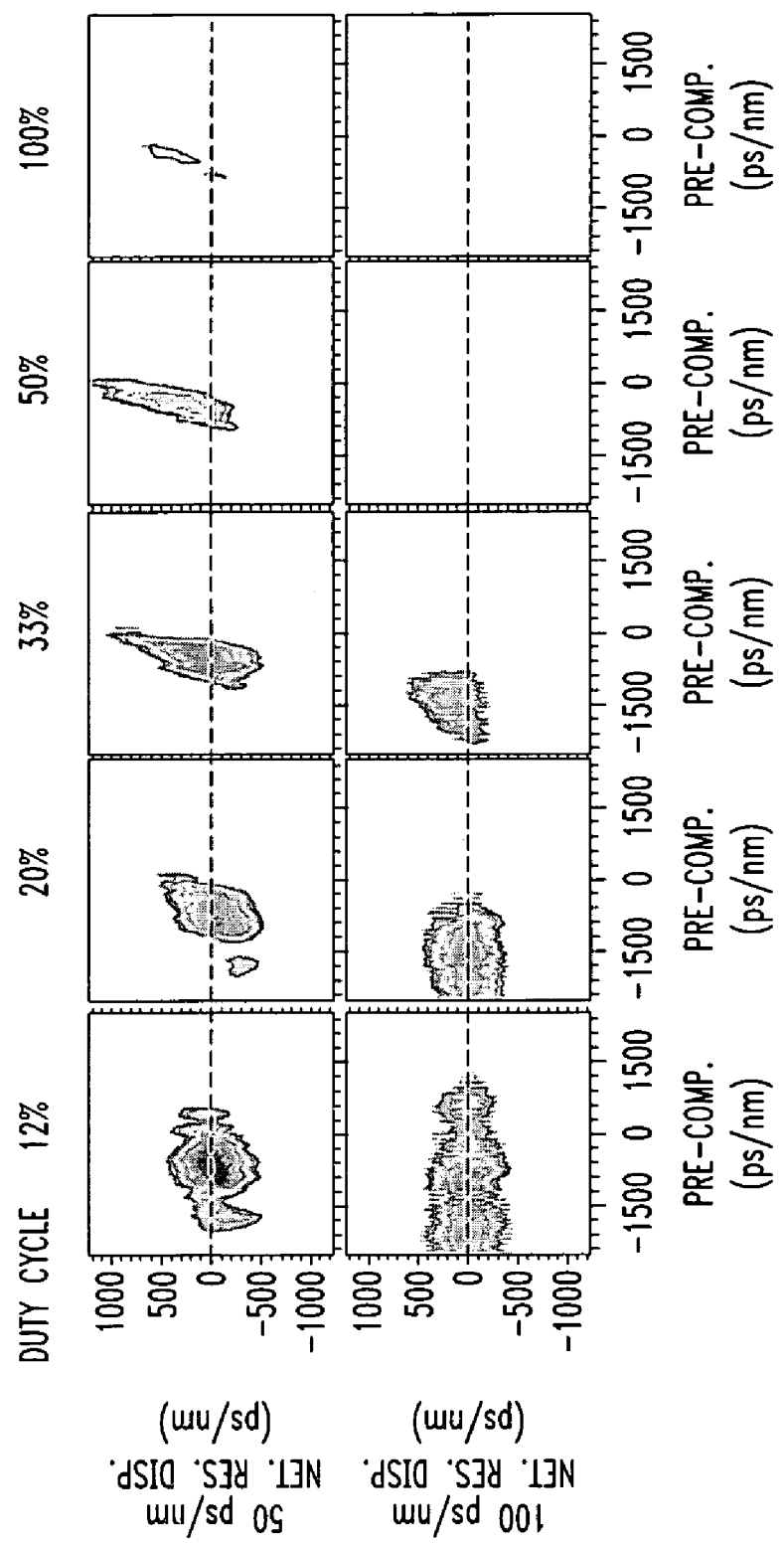
FIG. 6 graphically depicts the system performance for various duty cycles after transmission over 3000 km of TrueWave™ fiber useful in understanding the invention.

FIG. 6 graphically depicts the system performance for various duty cycles (modulation formats) after transmission over 3000 km of TrueWave™ fiber for the system of FIG. 4. Consistently, negative residual dispersion per span results in better performance at all duty cycles represented in FIG. 6. It is likely though, that the larger of the duty cycles will be utilized due to the increased spectral efficiencies of the larger duty cycles. The mapping of FIG. 6 is repeated for standard unshifted fibers. Similar results to the experiment of FIG. 6 are achieved with respect to dispersion mapping, but less distortions are observed. Again, a negative residual dispersion per span results in better transmission performance, but in this case the standard unshifted fibers increase the reach of the communications system.

The system performance for various duty cycles was again tested, but after transmission over 5000 km of True-Wave™ fiber. Consistent with the results of FIG. 6, negative residual dispersion per span results in better performance at all duty cycles represented in this test. The mapping over 5000 km of TrueWave™ fiber is then repeated for standard un-shifted fibers. Similar results to the experiment over 5000 km of TrueWave™ fiber are achieved with respect to dispersion mapping, but less distortions are again observed. Again, a negative residual dispersion per span results in better transmission performance, and the standard unshifted fibers increase the reach of the communications system.

The experiments described above make it evident that the use of the standard unshifted fiber results in better transmission performance than the TrueWave™ fiber for long-haul systems. It should also be noted that optimum dispersion (pre-compensation and post-compensation) scales upward with distance in these cases. It is evident from the transmission results presented above that the new regime of transmission possesses superior transmission characteristics to DC solitons, which are commonly considered to be the best transmission regime for long-haul communications systems.

Accordingly, by imparting dispersion compensation in the prescribed manner, the communications system's performance can be optimized to achieve the new regime of transmission. Optimization is achieved not only by the total amount of pre-compensation that is provided, but also by the amount of post-compensation provided in the communications system.

Figure 7:
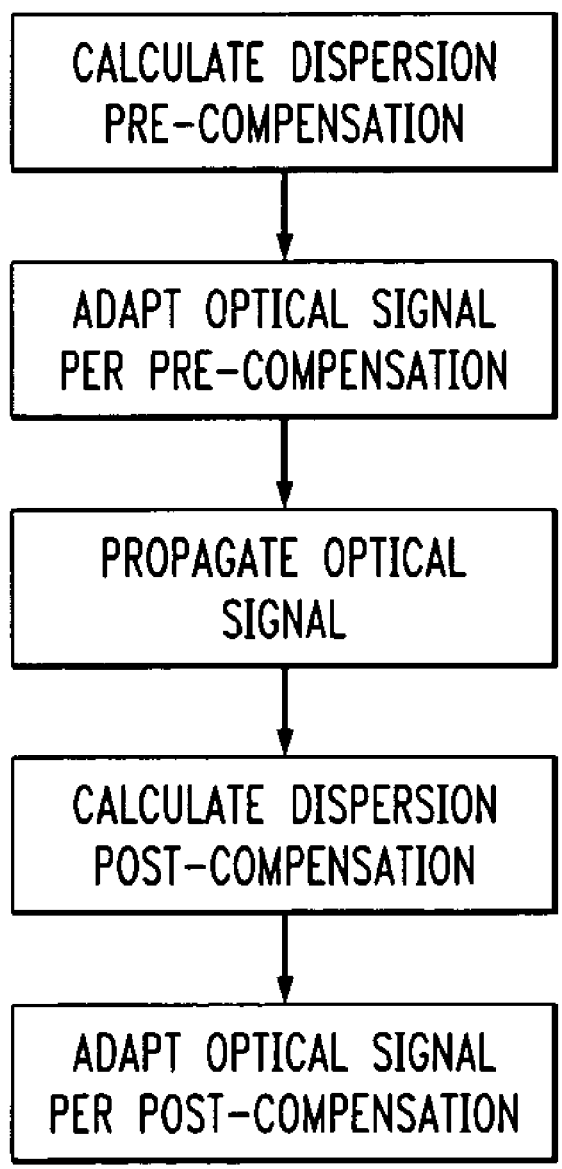
FIG. 7 depicts a flow diagram of a method for extending optical communication.

FIG. 7 depicts a flow diagram of one embodiment of a method 700 for extending optical communication. The method 700 uses the dispersion information of a known system to calculate an appropriate dispersion pre-compensation to be applied to a communications system comprising a plurality of spans. The method 700 goes on to apply a dispersion post-compensation to be applied to the communications system to optimize the transmission of the system. The effect of accomplishing the method 700 is to provide for a new regime of transmission that extends the reach of communications systems.

The method 700 is entered at step 702, wherein a dispersion pre-compensation is calculated using the equation (1):

$$C_{pre}^{opt} = C_{pre}^{span} - (N_{span}-1)*C_{RDPS}/2.$$

For an optical communications path composed of non-identical spans, the method 700 at step 702 instead uses equation (2) above to calculate dispersion pre-compensation.

Alternatively, the dispersion pre-compensation can be calculated through experimentation. For example, the cumulative dispersion of an optical communications path can be measured by propagating a known optical signal through the system, and measuring the resulting dispersive effects of the system. A dispersion pre-compensation can then be calculated based on the dispersive effects of the components in the optical communications path.

At step 704, the method 700 adapts the optical signal from a transmitter per the calculated pre-compensation. That is, at step 704 the first dispersion compensating element 150 provides the optical signal with a dispersion pre-compensation equal to that of the calculated pre-compensation.

At step 706, the optical signal is propagated through the optical communications path.

At step 708 a dispersion post-compensation is calculated. The dispersion post-compensation should be such as to provide the optimum cumulative net residual dispersion $C_{NRD}$ for a given optical communications path. Stated differently, the dispersion post-compensation is optimized for best transmission.

At step 710, the method 700 adapts the propagated optical signal per the calculated post-compensation. That is, at step 710 the second dispersion compensating element 160 provides the optical signal with a dispersion post-compensation equal to that of the calculated post-compensation.

The above-described method 700 of FIG. 7 provides a general methodology according to the subject invention.

Above-described invention is generally described within the context of an optical communications path having a plurality of spans in which a dispersion pre-compensation is imparted to an optical signal to be propagated prior to propagation through the first of the plurality of optical spans. Similarly, the invention is generally described as imparting a dispersion post-compensation to an optical signal that has traversed the entirety of the plurality of optical paths. It will be appreciated by those skilled in the art and informed by the teachings of the present invention a pre-compensation and post-compensation do not necessarily require processing, respectively, prior to the first span and after the last span. In fact, pre-compensation and post-compensation, to be effective, merely require processing prior to and after a plurality of optical paths, be those optical paths first, second, third or last, second from last, or third from last. In fact, an optical communications path comprising a plurality of spans may use multiple "stages" of pre/post compensation elements. For example, an optical communications path comprising ten spans may utilize pre-compensation prior to transmission via the first span and post-compensation after reception from the fourth span, then pre-compensation before transmission by the fifth span and post-compensation after reception by the tenth span. The inventors contemplate that the multiple-stage embodiments of the invention, may also be utilized within the context of spans in which optical signals passing there-through have not been subjected to a corresponding pre-compensation.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method comprising:
   pre-compensating an optical signal to compensate for a cumulative dispersion optimized for a representative optical span whose value depends on the average power evolution of the optical signal in an optical communications path, and to compensate for an amount of dispersion introduced into the optical communications path by any of a plurality of subsequent optical spans;
   wherein each of the subsequent optical spans contributes a dispersion to the optical signal, such that a total amount of said pre-compensating is determined by calculating an amount of net residual dispersion introduced into the optical communications path by the subsequent optical spans and subtracting the amount of calculated net residual dispersion from the cumulative dispersion optimized for a representative optical span times the total number of spans in the optical communications path,
   wherein the amount of net residual dispersion introduced into the optical communications path by the subsequent optical spans is equal to the sum of the net residual dispersion from the second span in the optical communications path to the last span in the optical communications path, and
   wherein the cumulative dispersion optimized for a representative optical span has a value that depends on the average power evolution of the optical signal in the optical communications path.

2. The method of claim 1, wherein the number of subsequent optical spans is equal to zero.

3. The method of claim 1, wherein said cumulative dispersion optimized for a representative optical span comprises a dispersion nominally included by an optical fiber of 10 to 25 kilometers.

4. The method of claim 1, wherein said pre-compensating an optical signal to compensate for a cumulative dispersion optimized for a representative optical span is adapted to produce transform-limited pulses at a location in said optical communications path where said optical signal nominally exhibits half of a non-linearity induced by said optical communications path.

5. The method of claim 1, wherein said optical communications path comprises $N_{span}$ spans, where $N_{span}$ is an integer, and said cumulative dispersion optimized for a representative optical span, $C_{pre}^{span}$, is a dispersion optimized for a representative optical span and nominally induced by an optical fiber of 10 to 25 kilometers, and wherein each of the subsequent optical spans (n) has a net residual dispersion $C_{NRDS}(n)$, wherein $C_{pre}^{span}$, $N_{span}$, and $C_{NRDS}(n)$ are related by the following equation:

$$C_{pre}^{opt} = N_{span} * C_{pre}^{span} - \sum_{n=2}^{N_{span}} C_{NRDS}(n).$$

6. The method of claim 1, further comprising:
providing a dispersion post-compensation to the optical signal after propagation through said optical communications path.

7. A method comprising:
pre-compensating an optical signal to compensate for a cumulative dispersion optimized for a representative optical span whose value depends on the average power evolution of the optical signal in an optical communications path, and to compensate for an amount of dispersion introduced into the optical communications path by any of a plurality of subsequent optical spans;
wherein each of the subsequent optical spans contributes a substantially similar dispersion to the optical signal, such that a total amount of said pre-compensating is determined by calculating an amount of cumulative dispersion introduced into the optical communications path by the subsequent optical spans, dividing the amount of the calculated cumulative dispersion by two, and subtracting the divided amount of calculated cumulative dispersion from the cumulative dispersion optimized for a representative optical span, wherein the amount of cumulative dispersion introduced into the optical communications path by the subsequent optical spans is equal to the total number of spans in the communications path minus one, multiplied by the amount of substantially similar dispersion introduced by each span, and wherein the cumulative dispersion optimized for a representative optical span has a value that depends on the average power evolution of the optical signal in the optical communications path.

8. The method of claim 7, wherein said optical communications path comprises $N_{span}$ spans, where $N_{span}$ is an integer, and said cumulative dispersion optimized for a representative optical span, $C_{pre}^{span}$, is a dispersion optimized for a single span and nominally induced by an optical fiber of 10 to 25 kilometers, and wherein each of the subsequent optical spans contributes a substantially similar dispersion $C_{RDPS}$, wherein $C_{pre}^{span}$, $N_{span}$, and $C_{RDPS}$ are related by the following equation:

$$C_{pre}^{opt} = C_{pre}^{span} - (N_{span}-1) * C_{RDPS}/2.$$

9. A method for use in a communication system in which an optical communications path comprises a plurality of optical spans, each of said optical spans contributing nonlinear distortions to an optical signal passing there-through, said method comprising:
providing a dispersion pre-compensation to the optical signal in the optical communications path prior to transmission through the plurality of optical spans such that the limiting nonlinear effect that produces signal distortions is suppressed, wherein the amount of said dispersion pre-compensation is determined by calculating an amount of net residual dispersion introduced into the optical communications path by the plurality of optical spans and subtracting the amount of the calculated net residual dispersion from a cumulative dispersion optimized for a representative optical span times the total number of spans in the optical communications path, wherein the amount of net residual dispersion introduced into the optical communications path by the plurality of optical spans is equal to the sum of the net residual dispersion from the second span in the optical communications path to the last span in the optical communications path, and wherein the cumulative dispersion optimized for a representative optical span has a value that depends on the average power evolution of the optical signal in the optical communications path; and
providing a dispersion post-compensation to said optical signal in the optical communications path after transmission through said plurality of optical spans.

10. A method for use in a communication system in which an optical communications path comprises a plurality of optical spans, each of said optical spans contributing substantially similar nonlinear distortions to an optical signal passing there-through, said method comprising:
providing a dispersion pre-compensation to the optical signal in the optical communications path prior to transmission through the plurality of optical spans such that the limiting nonlinear effect that produces signal distortions is suppressed, wherein the amount of said dispersion pre-compensation is determined by calculating an amount of cumulative dispersion introduced into the optical communications path by the plurality of optical spans, dividing the amount of the calculated cumulative dispersion by two, and subtracting the divided amount of calculated cumulative dispersion from a cumulative dispersion optimized for a representative optical span, wherein the amount of cumulative dispersion introduced into the optical communications path by the plurality of optical spans is equal to the total number of spans in the communications path, minus one, multiplied by the amount of dispersion introduced by each span, and wherein the cumulative dispersion optimized for a representative optical span has a value that depends on the average power evolution of the optical signal in the optical communications path; and
providing a dispersion post-compensation to said optical signal in the optical communications path after transmission through said plurality of optical spans.

11. A method for use in an communications system in which an optical communications path comprises a plurality of optical spans, each of said optical spans contributing respective nonlinear distortions to an optical signal passing there-through, said method comprising:
providing a dispersion pre-compensation to the optical signal in the optical communications path, such that the limiting nonlinear effect that produces signal distortions for long-haul transmission is suppressed, prior to transmission through a plurality of optical spans; and providing a dispersion post-compensation to said optical signal in the optical communications path after transmission through said plurality of optical spans, said dispersion pre-compensation having an absolute value greater than said dispersion post-compensation;

wherein each of the plurality of optical spans contributes a dispersion to the optical signal, such that the amount of said dispersion pre-compensation is determined by calculating an amount of net residual dispersion introduced into the optical communications path by the plurality of optical spans and subtracting the amount of calculated net residual dispersion from a cumulative dispersion optimized for a representative optical span times the total number of spans in the optical communications path, wherein the amount of net residual dispersion introduced into the optical communications path by the plurality of optical spans is equal to the sum of the net residual dispersion from the second span in the optical communications path to the last span in the optical communications path, and wherein the cumulative dispersion optimized for a representative optical span has a value that depends on the average power evolution of the optical signal in the optical communications path.

12. A method for use in an communication system in which an optical communications path comprises a plurality of optical spans, each of said optical spans contributing respective nonlinear distortions to an optical signal passing there-through, said method comprising:

providing a dispersion pre-compensation to the optical signal in the optical communications path, such that the limiting nonlinear effect that produces signal distortions for long-haul transmission is suppressed, prior to transmission through a plurality of optical spans; and providing a dispersion post-compensation to said optical signal in the optical communications path after transmission through said plurality of optical spans, said dispersion pre-compensation having an absolute value greater than said dispersion post-compensation;

wherein each of the plurality of optical spans contributes a substantially similar dispersion to the optical signal, such that the amount of said dispersion pre-compensation is determined by calculating an amount of cumulative dispersion introduced into the optical communications path by the plurality of optical spans, dividing the amount of the calculated cumulative dispersion by two, and subtracting the divided amount of calculated cumulative dispersion from a cumulative dispersion optimized for a representative optical span, wherein the amount of cumulative dispersion introduced into the optical communications path by the plurality of optical spans is equal to the total number of spans in the communications path, minus one, multiplied by the amount of substantially similar dispersion introduced by each span, and wherein the cumulative dispersion optimized for a representative optical span has a value that depends on the average power evolution of the optical signal in the optical communications path.

13. Apparatus for use in an optical communications path, comprising:

at least one dispersion pre-compensating element for pre-compensating an optical signal to compensate for a cumulative dispersion optimized for a representative optical span whose value depends on the average power evolution of the optical signal in the optical communications path, and to compensate for an amount of dispersion introduced into the optical communications path by any subsequent optical spans;

wherein each of the subsequent optical spans contributes a dispersion to the optical signal, such that a total amount of said pre-compensating is determined by calculating an amount of net residual dispersion introduced into the optical communications path by the subsequent optical spans and subtracting the amount of calculated net residual dispersion from the cumulative dispersion optimized for a representative optical span times the total number of spans in the optical communications path, wherein the amount of net residual dispersion introduced into the optical communications path by the subsequent optical spans is equal to the sum of the net residual dispersion from the second span in the optical communications path to the last span in the optical communications path, and wherein the cumulative dispersion optimized for a representative optical span has a value that depends on the average power evolution of the optical signal in the optical communications path.

14. The apparatus of claim 13 further comprising:

at least one dispersion post-compensating element for providing dispersion post-compensation to said optical signal in the optical communications path after transmission through the optical communications path.

15. The apparatus of claim 14, wherein said at least one dispersion post-compensating element is a single-mode fiber.

16. The apparatus of claim 14, wherein said at least one dispersion post-compensating element is a dispersion-compensating fiber.

17. The apparatus of claim 14, wherein said at least one dispersion post-compensating element is a diffraction grating.

18. The apparatus of claim 13, wherein said at least one dispersion pre-compensating element is a single-mode fiber.

19. The apparatus of claim 13, wherein said at least one dispersion pre-compensating element is a dispersion-compensating fiber.

20. The apparatus of claim 13, wherein said at least one dispersion pre-compensating element is a diffraction grating.

* * * * *